(12) United States Patent
Kunz et al.

(10) Patent No.: US 10,194,347 B2
(45) Date of Patent: Jan. 29, 2019

(54) METHOD FOR MANAGING OVERLOAD IN A MOBILE COMMUNICATION NETWORK

(71) Applicant: NEC EUROPE LTD., Heidelberg (DE)

(72) Inventors: Andreas Kunz, Heddesheim (DE); JaeSeung Song, Seongnam-si (KR); Genadi Velev, Darmstadt (DE); Gottfried Punz, Vienna (AT)

(73) Assignee: NEC CORPORATION, Tokyo (JP)

( * ) Notice: Subject to any disclaimer, the term of this patent is extended or adjusted under 35 U.S.C. 154(b) by 354 days.

(21) Appl. No.: 14/891,702

(22) PCT Filed: May 19, 2014

(86) PCT No.: PCT/EP2014/060265
§ 371 (c)(1),
(2) Date: Nov. 17, 2015

(87) PCT Pub. No.: WO2014/184392
PCT Pub. Date: Nov. 20, 2014

(65) Prior Publication Data
US 2016/0112897 A1    Apr. 21, 2016

(30) Foreign Application Priority Data
May 17, 2013   (EP) ..................................... 13168290

(51) Int. Cl.
*H04W 28/02*    (2009.01)
*H04W 4/70*     (2018.01)
(Continued)

(52) U.S. Cl.
CPC ....... *H04W 28/0289* (2013.01); *H04L 47/741* (2013.01); *H04W 4/70* (2018.02);
(Continued)

(58) Field of Classification Search
CPC ... H04W 28/0289; H04W 4/70; H04W 24/10; H04W 28/0231; H04W 48/06;
(Continued)

(56) References Cited

U.S. PATENT DOCUMENTS

| 2011/0158090 A1 | 6/2011 | Riley et al. |
| 2012/0257571 A1* | 10/2012 | Liao .......................... H04W 4/70 370/328 |
| 2014/0094139 A1 | 4/2014 | Xu et al. |

FOREIGN PATENT DOCUMENTS

| EP | 2509357 A1 | 10/2012 |
| EP | 2555562 A1 | 2/2013 |

(Continued)

OTHER PUBLICATIONS

"Discussion Paper on Congestion Indication Options", SA WG2 Meeting #96, San Diego, CA, USA, S2-130806, pp. 1-8, Apr. 2, 2013.

(Continued)

*Primary Examiner* — Melvin C Marcelo
(74) *Attorney, Agent, or Firm* — Leydig, Voit & Mayer, Ltd.

(57) ABSTRACT

A mobile communication network (MCN) and method for managing (overload in) an MCN having a radio access network and core network connected to the radio access network, wherein a plurality of user devices in form of non-MTC user devices like mobile phones and MTC user devices is connected to base station(s) of the radio access network, includes: a) detecting a presence of a network overload in the MCN, b) generating an overload report according to the detected network overload comprising one or more resource identifiers of the resources of the MCN on which the overload was detected, c) identifying (W1) user device(s) (UD) and/or application(s) affected by the network overload (OL) based on the overload report, and d) inform- (Continued)

ing one or more serving entities serving the resolved UD for temporarily suppressing communication requests, preferably in form of devices triggers (DT), for the resolved UD, preferably MTC UD.

27 Claims, 12 Drawing Sheets

(51) Int. Cl.
    *H04W 48/06*     (2009.01)
    *H04L 12/911*     (2013.01)
    *H04W 24/10*     (2009.01)
    *H04W 68/00*     (2009.01)
    *H04W 84/04*     (2009.01)

(52) U.S. Cl.
    CPC ....... *H04W 24/10* (2013.01); *H04W 28/0231* (2013.01); *H04W 28/0273* (2013.01); *H04W 48/06* (2013.01); *H04W 68/00* (2013.01); *H04W 28/0215* (2013.01); *H04W 84/04* (2013.01); *H04W 84/042* (2013.01)

(58) Field of Classification Search
    CPC . H04W 68/00; H04W 28/0215; H04W 84/04; H04W 84/042; H04L 47/741
    See application file for complete search history.

(56) References Cited

FOREIGN PATENT DOCUMENTS

| EP | 2605606 A2 | 6/2013 |
|---|---|---|
| WO | WO 2012107627 A1 | 8/2012 |

OTHER PUBLICATIONS $3^{rd}$ Generation Partnership Project; Technical Specification Group Services and System Aspects; Architecture enhancements to facilitate communications with packet data networks and applications (Release 11), 3GPP Standard; 3GPP TS 23.682, $3^{rd}$ Generation Patnership Project (3GPP), vol. SA WG2, No. V11.3.0, Dec. 18, 2012 (Dec. 18, 2012), pp. 1-29, XP050691117.

$3^{rd}$ Generation Partnership Project; Technical Specification Group Services and System Aspects; System improvements for Machine-Type Communications (MTC) (Release 11) 3GPP Standard; 3GPP TR 23.888, $3^{rd}$ Generation Partnership Project (3GPP), vol. SA WG2, No. V11.0.0, Sep. 18, 2012 (Sep. 18, 2012), pp. 1-165, XP050649142.

HTC et al: "Proposed conclusion on overload handling for device triggering", 3GPP Draft; S2-115465-(WASS2-115368-WASS2-115307-WASS2-115301-WASS2-114813_ OVERLOADCONTROL, $3^{rd}$ Generation Partnership Project (3GPP), vol. SA WG2, No. San Francisco, USA; Nov. 14, 2011-Nov. 18, 2011, Nov. 19, 2011 (Nov. 19, 2011), XP050575839.

$3^{rd}$ Generation Partnership Project; Technical Specification Group Services and System Aspects; Policy and charging control architecture (Release 12), 3GPP Standard; 3GPP TS 23.203, $3^{rd}$ Generation Partnership Project (3GPP), vol. SA WG2, No. V12.0.0, Mar. 5, 2013 (Mar. 5, 2013), pp. 1-183, XP050691808.

$3^{rd}$ Generation Partnership Project; Technical Specification Group Core Network and Terminals; Policy and Charging Control signaling flows and Quality of Service (QoS) parameter mapping (Release 11), 3GPP Standard; 3GPP TS 29.213, $3^{rd}$ Generation Partnership Project (3GPP), vol. CT WG3, No. V11.6.0, Mar. 15, 2013 (Mar. 15, 2013), pp. 1-19, XP050692158.

3GPP TR 23.705 V0.3.0 (Apr. 2013), Apr. 2013, $3^{rd}$ Generation Partnership Project; Technical Specification Group Services and Systems Aspects; System Enhancements for User Plane Congestion Management (Release 12), pp. 1-18.

3GPP TR 23.887 V0.9.0 (Apr. 2013), Apr. 2013, $3^{rd}$ Generation Partnership Project; Technical Specification Group Services and System Aspects; Machine-Type and other Mobile Data Applications Communications Enhancements (Release 12), pp. 1-121.

ETSI TS 136 413 V11.3.0 (Apr. 2013), Apr. 2013, LTE; Evolved Universal Terrestrial Radio Access Network (E-UTRAN); S1 Application Protocol (S1AP) (3GPP TS 36.413 version 11.3.0 Release 11), pp. 1-278.

ETSI TS 123 003 V11.5.0 (Apr. 2013), Apr. 2013, Digital cellular telecommunications system (Phase 2+); Universal Mobile Telecommunications System (UMTS); Numbering, addressing and identification (3GPP TS 23.003 version 11.5.0 Release 11), pp. 1-85.

\* cited by examiner

METHOD FOR MANAGING OVERLOAD IN A MOBILE COMMUNICATION NETWORK

CROSS-REFERENCE TO RELATED APPLICATIONS

This application is a U.S. national stage application under 35 U.S.C. § 371 of International Application No. PCT/EP2014/060265, filed on May 19, 2014, and claims benefit to European Patent Application No. 13 168 290.8, filed on May 17, 2013. The International Application was published in English on Nov. 20, 2014, as WO 2014/184392 A2 under PCT Article 21(2).

FIELD

The present invention relates to a mobile communication network, a method of managing a mobile communication network, and a method for managing overload in a mobile communication network comprising a radio access network and a core network connected to the radio access network, wherein a plurality of user devices in form of non-MTC user devices like mobile phones and/or MTC user devices is connected to one or more base stations of the radio access network.

BACKGROUND

In conventional mobile communication networks in particular in a core network overload maybe experienced in the control plane. For example many users may simultaneously initiate attached request procedures or service request procedures with their user devices resulting in overload. Overload in the user plane may occur for example due to an unexpected situation or concentrated heavy user activity. Such a heavy user activity may for example a massive high definition video streaming service, the download of big files or the like. Further in addition to such normal user devices there may be a number of machine type communication MTC devices deployed in the same cells of a base station of a mobile communication network together with normal user devices, i.e. non-MTC user devices, which are frequently or infrequently transmitting data on their own or based on a trigger request from a machine type communication application server.

When the mobile communication network is running into overload in a certain node or entity of the network then the device trigger requests for MTC devices scheduled at the time of the overload by the MTC application server would increase the already present overload. Already ongoing data transfers of machine type communication devices being in active mode are handled by conventional congestion handling defined in 3GPP TR 23.705. However a machine type communication device in idle mode should not become active during the present of an overload situation. This is possible, since machine type communication devices are different from normal user devices since their triggering is flexible to a substantial degree in contrast to normal user devices which a user would like to initiate multimedia sessions or the like.

In FIG. 1 shows a time relationship between a device trigger and a following active data transfer period. When a device trigger is received by the corresponding user device UD a time gap TG occurs resulting from processing time, state transfer from the mode IDLE to the mode ACTIVE and potentially a back-off timer in case of an overload for example in the mobility management entity MME until the user device UD has changed to mode ACTIVE and congestion is handled with conventional user plane congestion handling UPCON. The user device UD is therefore not immediately transmitting data after it received a device trigger DT.

In FIG. 2 the situation of user plane congestion and its relation to congestion handling of MTC device triggers is shown. In the upper half of FIG. 2 the number of trigger requests DT for machine type communication user devices UD, which are in idle mode, are shown and in the lower part the data traffic of user devices UD in active mode is shown during and around a congestion period which end time points t1 and t4 mark this period.

In FIG. 2 it is further assumed that two levels of congestion, namely a light and a civil congestion, exist: When a light congestion starts at time point t1 a triggering of machine type communication user devices which are currently in idle mode are be reduced in order to not to allow substantial data traffic to be generated in the upcoming period. In the depicted case of FIG. 2 the mobile communication system runs into severe congestion at time point t2 after which machine type communication device triggers are further reduced. With abatement of the overload situation at time points t3 and t4 respectively reverse handling is performed.

Overload or congestion management in the user plane may take place in parallel if radio access network user plane congestion and detection mechanisms.

FIG. 3 shows a scenario of current device triggers DT when a certain evolved node B eNB experiences an overload in the user plane—user plane congestion—or when a mobility management entity MME experiences a signaling overload in the control plane CP—control plane congestion—. In 3GPP TR 23.887 it is disclosed that the machine type communication interworking function machine type communication interworking function MTC-IWF supports a load control functionality to indicate the service capability servers SCS over the Tsp interface to limit trigger loads generated on said interface.

Further it is disclosed how the mobility management entity MME, the serving GPRS support node SGSN/the short message service center SMS-SC and the machine type communication-interworking function machine type communication interworking function MTC-IWF provides overload control functionality to allow the mobility management entity MME, the serving GPRS support node SGSN or the short message service center SMS-SC to limit trigger loads generated over the T5b, T5a and/or T4 interface. The information which the mobility management entity MME or the serving GPRS support node SGSM can send in an appropriate message over the T5b/T5a interface with optional information elements indicating only T5 suppression parameters like suppression factor, suppression duration or suppression subcategories, for example a specific priority type or the like.

However, the above mentioned conventional technique has inter alia the disadvantage that only a general indication to the service capability server SCS in particular in case of MTC user devices can be given that there is an overload situation. Thus all machine type communication user devices in the whole network are affected although a network overload may only specific to one or a very limited number of nodes.

SUMMARY

An aspect of the invention provides a method for managing overload in a mobile communication network including a radio access network and a core network connected to the radio access network, wherein a plurality of user devices in form of non-MTC user devices and/or MTC user devices is connected to one or more base stations of the radio access network, the method comprising: a) detecting a presence of a network overload in the mobile communication network; b) generating an overload report according to the detected network overload having one or more resource identifiers of the resources of the mobile communication network on which the network overload was detected; c) identifying one or more user devices and/or applications affected by the network overload based on the overload report; and d) informing one or more serving entities serving resolved user devices for temporarily suppressing communication requests.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
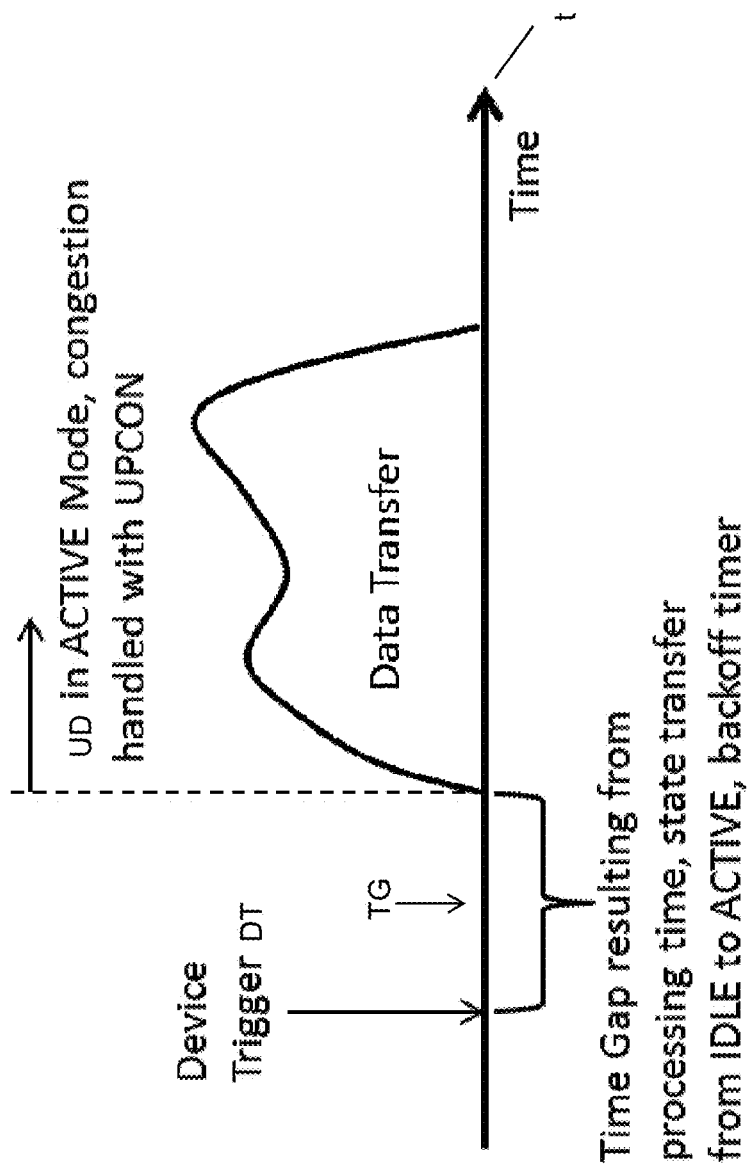
FIG. 1 shows a time relationship between a received device trigger and an active data transfer period according to a conventional triggering method.

An aspect of the invention relates to a method for managing overload in a mobile communication network comprising a radio access network and a core network connected to the radio access network, wherein a plurality of user devices in form of non-MTC user devices like mobile phones and/or MTC user devices is connected to one or more base stations of the radio access network. The present invention relates further to a mobile communication network comprising a radio access network and a core network connected to the radio access network wherein a plurality of user devices in form of non-MTC user devices like mobile phones and/or MTC user devices is connected to one or more base stations of the radio access network. The present invention even further relates to a method for managing a mobile communication network comprising a radio access network and a core network connected to the radio access network, wherein a plurality of user devices in form of non-MTC user devices like mobile phones and/or MTC user devices is connected to one or more base stations of a radio access network is defined. Although applicable to user equipment or user devices in general the present invention will be described with regard to MTC devices for overload.

An aspect of the present invention provides a method for managing overload in a mobile communication network and a mobile communication network which avoid to apply a general overload procedure causing a blocking of all user devices in the mobile communication network whether affected by the network overload or not.

It is further aspect of the present invention to provide a method for managing overload in the mobile communication network and a mobile communication network enabling enhanced overload or congestion management.

It is a further aspect of the present invention to provide a method for managing overload in a mobile communication network and a mobile communication network with enhanced flexibility when managing the overload.

It is an even further aspect of the present invention to provide a method for managing overload in a mobile communication network and a mobile communication network saving resources and avoid or at least limit overload scenarios from the beginning.

An aspect of the invention provides a method for managing overload in a mobile communication network comprising a radio access network and a core network connected to the radio access network, wherein a plurality of user devices in form of non-MTC user devices like mobile phones and/or MTC user devices is connected to one or more base stations of a radio access network is defined An aspect of the invention provides a method is characterized by the steps of
 a) Detecting a presence of a network overload in the mobile communication network,
 b) Generating an overload report according to the detected network overload comprising one or more resource identifiers of the resources of the mobile communication network on which the overload was detected,
 c) Identifying one or more user devices and/or applications affected by the network overload based on the overload report, and
 d) Informing one or more serving entities serving the resolved user devices for temporarily suppressing communication requests, preferably in form of devices triggers, for the resolved user devices, preferably MTC user devices.

An aspect of the invention provides a mobile communication network comprising a radio access network and a core network connected to the radio access network, with a plurality of user devices in form of non-MTC user equipment like mobile phones and/or MTC user equipment is connected to one or more base stations of the radio access network is defined.

According to an aspect of the invention the mobile communication network is characterized by means operable to perform the following steps:
 a) Detecting a presence of a network overload in the mobile communication network,
 b) Generating an overload report according to the detected network overload comprising one or more resource identifiers of the resources of the mobile communication network on which the overload was detected, c) Identifying one or more user devices and/or applications affected by the network overload based on the overload report, and d) Informing one or more serving entities serving the resolved user devices for temporarily suppressing communication requests, preferably in form of devices triggers, for the resolved user devices, preferably MTC user devices.

An aspect of the invention provides a method for managing a mobile communication network comprising a radio access network and a core network connected to the radio access network, wherein a plurality of user devices in form of non-MTC user devices like mobile phones and/or MTC user devices is connected to one or more base stations of a radio access network is defined.

An aspect of the invention provides a method characterized by the steps of a) Requesting a communication with a user device towards a managing node in the core network accompanied by application information, preferably wherein the application information include an identifier of the application requesting the communication and/or directly service information for the requesting application, a) Identifying the application by the accompanied application information and corresponding service information, and b) Installing one or more rules of a policy based on the service information of the resolved application after successfully requesting communication with the user device.

In other words, an aspect provides a method that installs policy rule(s) specific to an application description, preferably including the corresponding bearer configuration for optimized traffic per application and user device at the time of a communication request, preferably in form of a device triggering.

An aspect of the invention provides a mobile communication network comprising a radio access network and a core network connected to the radio access network is defined, with a plurality of user devices in form of non-MTC user equipment like mobile phones and/or MTC user equipment is connected to one or more base stations of the radio access network.

In an aspect of the invention, the mobile communication network is characterized by means operable to perform the following steps:

a) Requesting a communication, preferably a device trigger, with a user device accompanied by application information, preferably an identifier of the application requesting the communication or directly service information for the requesting application, b) Identifying the application by the accompanied application information and corresponding service information, and c) Installing one or more rules of a policy based on the service information of the resolved application.

An aspect of the invention provides a method for managing overload, characterized by a) performing any method according to the invention described herein.

The terms "user device" and "user equipment" as well as the terms "MTC device", "MTC user device" can be used interchangeable throughout in the description. For example an MTC device may also be a "normal" user device like a smartphone, or the like.

The terms "MTC application sever" or "application server" can also be used interchangeably throughout in the description. For example a MTC application server may also be a "normal" application server, providing or used for firmware updates, etc.

According to an aspect of the invention it has been recognized that overload situations can be effectively managed when being experienced in a certain node by the detection of the overload situation and corresponding reporting with resource identifiers. The corresponding device triggers are then suppressed after identifying the applications or user devices affected by the overload.

According to an aspect of the invention it has been further recognized that further device triggering is prevented until the overload is resolved while non affected user devices can still be triggered or provide a corresponding data communication.

According to an aspect of the invention it has been even further recognized that the overload situation can be resolved much faster and with a more precise management of the network overload.

According to an aspect of the invention it has been even further recognized that communication requests or triggering of the user devices affected by the overload situation do not have to be recent by the originating entity but are be stored temporarily and continued to be conveyed when the overload situation is resolved.

According to a preferred embodiment one or more rules for an overload policy based on the overload report are generated, at least for performing step d), preferably wherein the rules are then applied on a bearer level. Generating an overload policy provides in an efficient way a blocking of for example incoming communication requests or device triggers on an entity in the communication path between an application issuing the communication request and a corresponding MTC user device. Such a policy may provide that all device triggers for affected MTC user devices are rejected served by a resource on which the overload was detected. When a rule is applied on a bearer level an efficient enforcement of the policy is enabled.

According to a further preferred embodiment connection requests, preferably triggers, according to the overload report for the resolved user devices are marked with a priority transmission indication, preferably by one or more application servers hosting resolved application and/or applications for the resolved user devices and wherein said priority transmission indication is evaluated and used for conveying the connection requests in spite of a present network overload This enhances on the one hand the flexibility: Even in case of a present network overload a connection request, preferably in form of a trigger is be transmitted if the evaluated priority is high enough. This ensures that important communication, for example communication of important machine type communication user devices is transmitted even when a network overload is present for the affected machine type communication user devices.

According to a further preferred embodiment the overload policy is installed on one or more application servers hosting resolved application and/or applications for the resolved user devices. This avoids unnecessary traffic to another entity in the network thus efficiently avoiding further congestion within the mobile communication network. For example device triggers for a machine type communication user device are suppressed on the entity initiating the request rather than transmitted to another entity which blocks them later in the communication path.

According to a further preferred embodiment session description information for the resolved user devices are provided to an overload management entity for performing at least steps c) to d). Session description information, for example corresponding parameters are used to mitigate the overload or the congestion respectively. For example the overload management entity may try to indicate by setting their maximum bit rate to zero which causes users devices with ongoing bearers to release in order to free resources. Thus the overload is mitigated.

According to a further preferred embodiment the resource identifiers are mapped to a geographic area. This enables in a fast and easy way to detect affect user devices affected by the network overload. In particular step c) can be performed in a very easy and quickly.

According to a further preferred embodiment transmission of the overload report is performed according to 3GPP TS 36.413 in the opposite direction. This allows for example the use of S1-AP messages indicating the overload start and overload end from a base station to a mobility management entity. This enables a transmission of the overload report with standardized reliable protocols. Further implantation can be performed easily in existing mobile communication networks.

According to a further preferred embodiment the overload report is transmitted in the user plane, preferably according to 3GPP TR 22.705. This enables to transmit the overload report in the user plane for example when an overload is detected in the control plane. This enables also a transmission of the overload report with standardized reliable protocols. Further implantation can be performed easily in existing mobile communication networks.

According to a further preferred embodiment the mapping is performed by a lookup in a database, wherein the database is maintained by the overload management entity and/or wherein the database is maintained by a centralized entity of the mobile communication network, preferably a home subscriber server. This allows a reliable and fast lookup and therefore mapping. When the database is hosted or maintained by the overload management entity an internal and therefore fast processing is possible to check whether for example a device trigger request is destined to one or more of the user devices affected by the overload situation by checking whether the user device is affected are contained in the database.

According to a further preferred embodiment a mobility behavior of one or more of the affected user devices is determined and stored accordingly in the database. For instance the overload management entity determines or receives information about the mobility behavior of the affected user devices for example if they are fixed installed, being nomadic, having a low mobility or the like. Then based on the mobility behaviors a more detailed overload management can be provided: Communication requests to or from devices which are fixed or having a fairly low mobility can be efficiently blocked to avoid an increase of the network overload whereas fast moving user devices which are only for short period of time affected by the network overload can further be used without restriction since the efficient time in the area of the network overload is low.

According to a further preferred embodiment the database of the congestion management entity is created at the time of the last connection request of a corresponding user device. Such database maybe created with information of a corresponding serving node and therefore enables an automatic creation as well as entry for the corresponding user device.

According to a further preferred embodiment tan association between the one or more geographic regions of the network overload and affected user devices and/or applications is stored in the database, preferably wherein the database is maintained by the congestion management entity. This allows a fast way to determine the geographic region of a network overload and consequently affected user devices by the network overload in the database. Further statistics can be generated using the (congestion) database, for example identifying frequently occurring bottle necks in the network and removing them.

According to a further preferred embodiment the overload report is proactively transmitted to one or more serving devices serving in the corresponding affected user devices. By proactively sending for example an overload report to the serving capabilities server or machine type communication application servers indicating for example the geographic area and optionally a list of affected user devices. This enables to shorten the time until the suppression of communication request, since for example the machine type communication application server knows prior to triggering which user devices will be affected by the network overload and may not issue a corresponding trigger and wait for an acknowledgement. Thus, unnecessary data communication is further reduced.

According to a further preferred embodiment in case the overload report is transmitted from an entity different from a policy deciding entity in the mobile communication network service descriptions of affected user devices are updated and transmitted to said policy deciding entity. This allows for example that the machine type communication interworking function machine type communication interworking function MTC-IWF may act as an application function and updates service description for the affected user devices to for example the policy and charging rules function PCRF resulting in an efficient policy decision. For example in case the policy and charging rules function PCRF release some bearers before it could now perform a dedicated bearer setup for such users devices or upgrade a quality of service to the normal setting before the occurrence of the network overload.

According to a further preferred embodiment session description information is forwarded to the policy deciding entity, preferably by the overload management entity. For instance the policy charging rules function obtain session description information from the machine type communication interworking function MTC-IWF. Such session description information may be used for a policy decision: For example in case there is an indication from the overload management entity to inform the machine type communication interworking function machine type communication interworking function MTC-IWF that bearers of some user devices can be released in order to free resources or should be modified with the lower quality of service then the policy deciding entity may create a corresponding rule and the rule is applied on the bearer level. Thus efficient resource management is enabled.

According to a further preferred embodiment resolved user devices are notified, preferably via GTP options, about the present overload. This allows at the corresponding user device itself can use this information to provide a contribution to mitigate the network overload.

According to a further preferred embodiment one or more actions are initiated with regard to the resolved user devices upon providing a notification about the present overload, preferably wherein a backoff time is initiated, preferably on the user device. This enables that the affected user equipment and/or another entity in the mobile communication network may initiate an action or actions to mitigate congestion. If a backoff time is initiated, communication requests or trigger requests may be suppressed until the time period in the backoff time has elapsed. Therefore for example a projected time calculated or determined in advance for the period of the presence of a network overload may used for the backoff timer.

According to a further preferred embodiment reporting of user plane overload is performed via the control plane, preferably using NAS signaling and/or via piggybacking in the user plane. This enhances the flexibility for reporting network overload.

According to a further preferred embodiment when a overload resolution is detected a corresponding overload resolution report is generated, a removal of the suppression of communication request is initiated and stored communication requests are continued to be delivered. This enables in a fast and efficient way to switch back to a normal situation, i.e. a network situation without network overload.

According to a further preferred embodiment service information of an application and/or an application identifier for a user device is provided to the overload management entity prior to a communication request of a user device and/or prior to step a). This allows that the service specific policy control can be performed at the time of device triggering, for example by using an Rx-like interface Rx*, for instance between the machine type communication interworking function machine type communication interworking function MTC-IWF and the policy charging rules function PCRF. Further this may be performed by handling service description and/or service information on the Tsp-interface additionally. Thus the overload situation in the network may be relaxed in advance.

According to a further preferred embodiment the overload management entity resolves the application of the application identifier and transmits the information of the resolved application to the policy deciding entity. Then the policy deciding entity may release some bearers and perform a dedicated bearer setup when an overload resolution was detected.

According to a further preferred embodiment after successfully initiating a communication or simultaneously to the communication request of the corresponding user device updated application and/or service information is provided to the policy deciding entity. This has the benefit that in case of unreachable user device is no unnecessary resources are reserved.

According to a further preferred embodiment a bearer setup procedure for sending and/or receiving data between the respective user device and the respective application according to the application requirements is initiated after network overload is resolved. This allows in a reliable way to continue normal network operation when network overload is resolved.

According to a further preferred embodiment a scheduling of communication requests of a user device based on application and/or service description is performed, preferably by the overload management entity. This enhances mitigation of congestion and enhances the flexibility when mitigating the network overload.

According to a further preferred embodiment indirect overload information of service nodes in the core network is used for determining the time for sending a communication request for or by a user device. For example indirect overload information is the load of a service node or the like. Thus further flexibility and management of overload is enhanced.

According to a further preferred embodiment said communication is requested by one or more application servers hosting one or more applications. When the communication is directly requested by application servers hosting the applications for the respective user devices, then a fast and efficient requesting can be provided.

According to a further preferred embodiment after the installation of said one or more rules a bearer setup or a bearer modification is initiated. This enables an efficient way to establish a communication between the respective user device and the application according to application requirements.

According to a further preferred embodiment inter arrival time, packet size, triggering interval and/or mobility information is included in the service information. This enhances the flexibility as well as increases the precision for generating the rules for the policy: efficient and well adapted policy rules according to the application are enabled.

According to a further preferred embodiment the request for communication is delivered further to the user device simultaneously to performing of step c). This shortens the time until a communication between the application and a user device may be set up.

According to a further preferred embodiment step c) is performed after successfully requesting communication with the user device. This also enhances the efficiency since a policy is installed only when the user device was reachable.

According to a further preferred embodiment a transfer of the information of the resolved application is performed simultaneously to the further delivery of the request for communication to the user device and the bearer setup or the bearer modification is initiated after successfully requesting communication with the user device. This further shortens the time until the policy is installed and the communication according to the application requirements between the application and the user device is established.

According to a further preferred embodiment communication request scheduling is performed based on information of the resolved application and/or service information. This avoids unnecessary device triggering and an efficient management of the resources in the mobile communication network.

According to a further preferred embodiment a load level of a node serving the user device are used for deciding when to send communication requests. This enables an efficient management of the serving node, since if the load is high and it is likely that a further data transfer and processing cannot be performed a device trigger for the user device by the application on the serving node is avoided. Thus the time of overload on the serving node is reduced.

There are several ways how to design and further develop the teaching of the present invention in an advantageous way. To this end it is to be referred to the patent claims subordinate to patent claims 1 and 28 on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will be explained.

FIG. 1 shows a time relationship between a received device trigger and an active data transfer period according to a conventional triggering method.

In FIG. 1 the time relationship between a device trigger DT and an active data transfer period is shown. After a user device UD has received the device trigger DT a time gap TG occurs resulting from the processing time of the device trigger DT, the state transfer from IDLE-mode to ACTIVE mode and optionally a further backoff-timer in case of an overload, for example in the mobility management entity MME. After the time period TG is over the user device UD is in active mode and data transfer begins.

Figure 2:
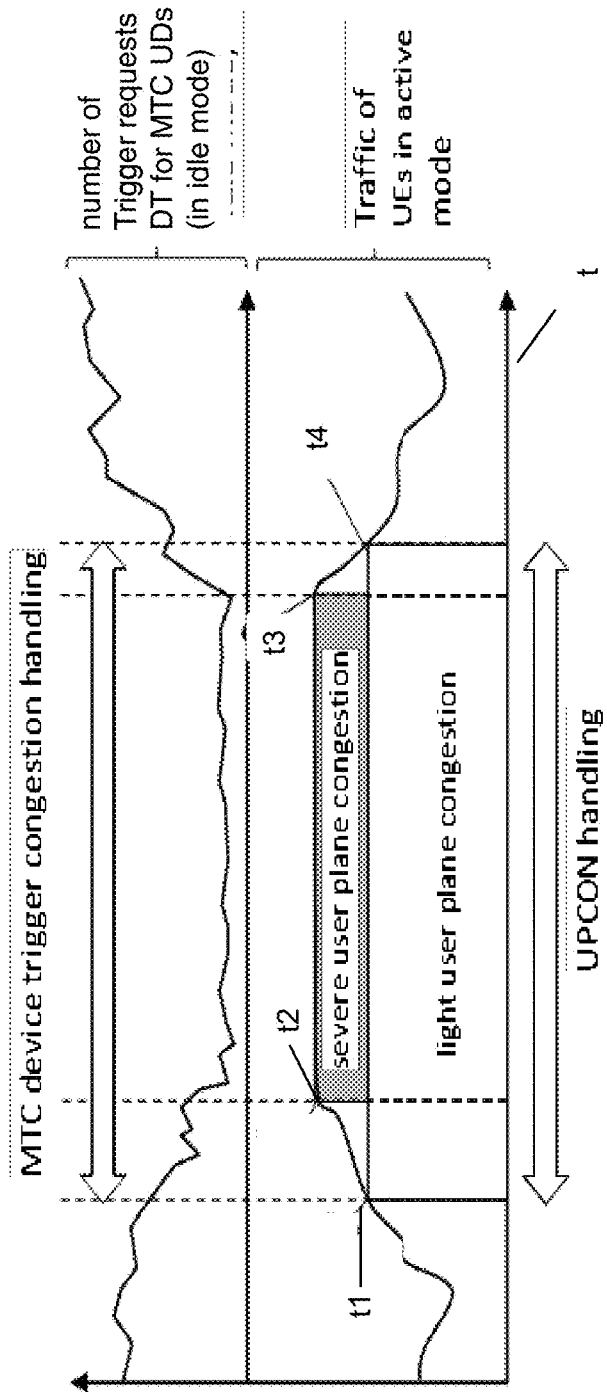
FIG. 2 shows an example for user planning congestion and relation to the number of triggers for machine type communication devices.

FIG. 2 shows an example for user planning congestion and relation to the number of triggers for machine type communication devices.

In FIG. 2 a situation of user plane congestion and its relation to congestion handling of machine type communication device triggers DT is shown. In the upper part of FIG. 2 the number triggers or trigger requests DT for machine type communication user devices being in IDLE mode is shown and the lower part of FIG. 2 corresponding data traffic of user devices UD in ACTIVE mode is shown during and around a congestion period t1-t4. It is assumed in FIG. 2 that there are two levels of congestion or overload, namely a light overload and a severe overload.

When the light congestion/overload starts, indicated with time point t1 a triggering of machine type communication user devices which are currently in IDLE mode is reduced in order to not allow substantial data traffic to be generated in the period ahead due to the light congestion. For example device triggers DT which are known to lead to larger data transmission or have lower priority are suppressed respectively due not occur.

In FIG. 2 the shown system runs in severe congestion at time point t2 after which machine type communication device trigger DT are further reduced to a minimum. For example only those having the highest priority are still allowed while all others are suppressed. With abatement of congestion the reverse handling occurs at the time point t3 and t4. Procedures for congestion management in the user plane according conventional UPCON solutions may take place in parallel and related radio access network user plane congestion detection mechanisms can be reused for detecting.

Figure 3:
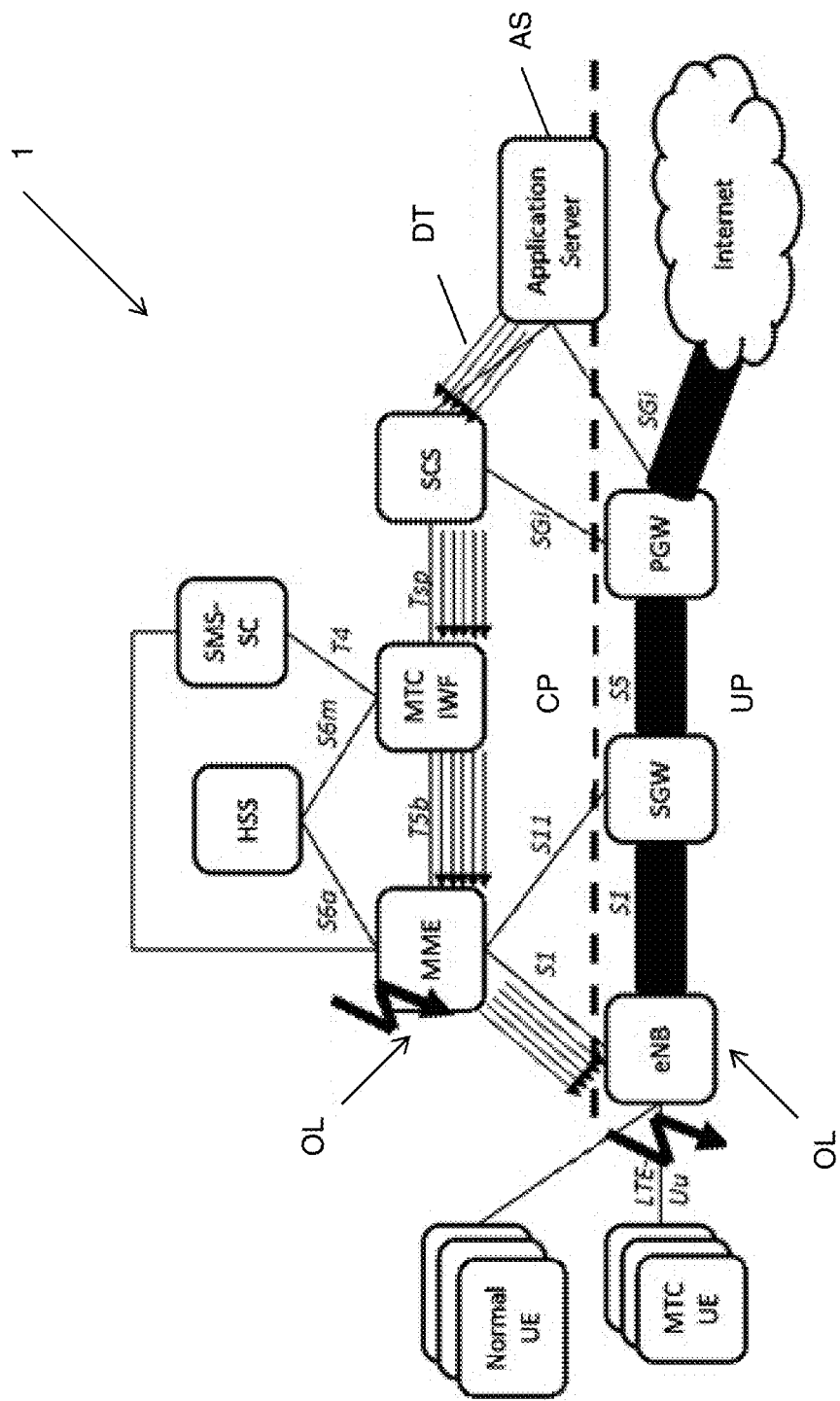
FIG. 3 shows a conventional system with detected overload.

FIG. 3 shows a conventional system with detected overload.

In FIG. 3 an overload scenario is shown with concurrent device triggers DT when a certain evolved node B eNB experiences an overload OL, i.e. as an example for user plane congestion or when a mobility management entity MME experiences a signaling overload OL in the control plane CP. The machine type communication interworking function machine type communication interworking function MTC-IWF supports load control functionality to indicate the service capability servers SCS over the Csp interface to limit trigger loads generated on it. Further in 3GPP TR 23.887 the mobility management entity MME, the serving GPRS support node SGSN and the short message service center SMS-SC as well as the machine type communication interworking function machine type communication interworking function MTC-IWF support overload control functionality in such a way that the mobility management entity MME, the serving GPRS support node SGSN, and the short message service center SMS-SC to limit trigger loads generated on it over the T5b/T5a/T4 interface.

The mobility management entity MME and/or the serving GPRS support node can send in an appropriate message over the T5/b/T5a interface with optional information elements indicating that only T5a,b suppresses parameters including suppression factor, suppression duration and/or suppression subcategories, for example a specific priority, etc. However in case of user plane congestion the following problems occur: For the machine type communication interworking function machine type communication interworking function MTC-IWF it is impossible to know which MTC user device are impacted and correspondingly which machine type communication application server AS to contact. The machine type communication interworking function machine type communication interworking function MTC-IWF would give in case of a conventional congestion handling only give a general indication to the service capability server over the Tsp-interface that there is an overload present. However this affects all the machine type communication user devices UD in the whole mobile communication network 1. Therefore a general overload procedure over the Tsp interface causes a blocking of all devices in the mobile communication network 1.

Figure 4:
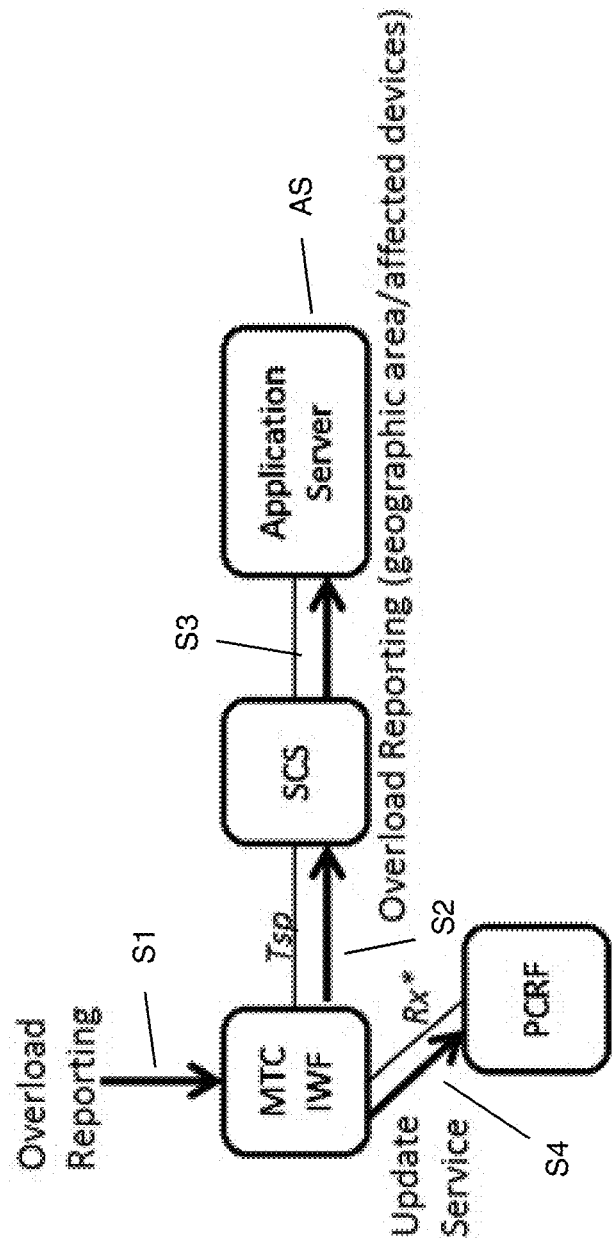
FIG. 4 shows steps of part of a method according to a first embodiment of the present invention.

FIG. 4 shows steps of part of a method according to a first embodiment of the present invention.

In FIG. 4 an overload policy control is shown representing one of the main principals of the present invention. An overload reporting is providing a first step S1 to the machine type communication interworking function MTC-IWF. Then an overload report comprising geographic area information and information about affected user devices is provided in a second step S2 via the Tsp interface to the service capability server SCS.

In a third step S3 the service capability server SCS forwards the overload report with the information to the application server AS.

In a fourth step S4 the machine type communication interworking function machine type communication interworking function MTC-IWF provides updated service information via the Rx* interface to a policy and charging rule function PCRF.

In the first step S1 the machine type communication interworking function machine type communication interworking function MTC-IWF receives the overload report for example via one of the ways according to FIG. 6 below. The overload report comprises a global identifier of an overloaded resource, for example a global cell identifier or a global evolved node B identification, or preferably an identifier according to 3GPP TS 23.003. Reporting to the machine type communication interworking function machine type communication interworking function MTC-IWF can be performed similar to the overload reporting from a mobility management entity MME to the evolved node B according to 3GPP TS 36.413 with S1 messages indicating an overload start and an overload end to the evolved node B eNB but now in the opposite direction, i.e. from the corresponding evolved node B eNB to the mobility management entity MME.

The mobility management entity MME may then send similar overload start/stop messages to the machine type communication-interworking function machine type communication interworking function MTC-IWF via the T5 interface. Further the mobility management entity may lookup which user devices UD have the overloaded evolved node B identification eNB ID in their last known E-UTRAN cell entry, i.e. those with same E-UTRAN cell global identity. If the last known E-UTRAN cell identification information is not too old or the user device is not moving too much this lookup is accurate.

Further it is also possible to transmit or convey geographic information/location information in the user plane UP as it is shown FIG. 6 below. This may be performed according to TR 23.705.

The machine type communication-interworking function machine type communication interworking function MTC-IWF then would map the global identifier of the overloaded resource or node to the affected user devices, here in form of machine type communication user devices UD, if this information is not provided before to the mobility management entity MME or if not already included in the corresponding overload report. The mapping may be performed with a lookup in an own maintained database, preferably created with serving node information at the time of the last device trigger DT or with help of a home subscriber server HSS in the mobile communication network 1. The machine type communication-interworking function machine type communication interworking function MTC-IWF then maintains a congestion database providing an association between an overloaded geographical area and user devices and/or user identifications.

When the machine type communication interworking function machine type communication interworking function MTC-IWF receives device trigger requests the machine type communication interworking function machine type communication interworking function MTC-IWF performs an internal processing to check whether the device trigger DT request is destined to one of the user devices UD affected by the network overload, i.e. if the user devices are contained in the congestion data base. At this time onwards incoming device trigger requests to affected user devices are responded with an overload report over the Tsp interface. The overload report comprises the geographic area which is served by the overloaded resource or node and may contain a list of affected user devices, preferably machine type communication devices in case the machine type communication-interworking function machine type communication interworking function MTC-IWF knows the mobility behavior of the affected user devices. For example the affected user device is may be fixed installed, being nomadic, having a low-mobility pattern, a fast moving pattern, or the like.

The reporting of the overload is performed independent of the present connection state of the affected user equipment either CONNECTED or IDLE. The service capability server SCS may then forward the information in the overload report to the machine type communication application server AS. The machine type communication application server AS may not need a detailed list of affected user devices but derive these from the geographic information which user devices are installed there and which in consequence should not be at least temporarily triggered from now on. This applies in particular for fixed installed or nomadic user devices.

On the other hand in case the machine type communication-interworking function machine type communication interworking function MTC-IWF knows from previous device trigger DT requests which service capability server SCS or machine type communication application servers AS are serving the machine type communication user devices UD, then the machine type communication-interworking function machine type communication interworking function MTC-IWF may proactively send an overload report to the service capability server SCS or the machine type communication application server(s) AS indicating the geographic region or area and a potential list of affected user devices here in form of machine type communication devices UD.

Further if the overload report was obtained by the machine type communication-interworking function machine type communication interworking function MTC-IWF from the entity different from a policy deciding entity like a policy and charging rules function PCRF, the machine type communication-interworking function machine type communication interworking function MTC-IWF may be then act as a application function and updates service description for the affected user devices here in form of machine type communication user devices UD and send the updated service description to the policy and charging rules function PCRF.

In a further option if additional information about the session description, for example machine type communication devices in an overloaded area can release their sessions as low-priority user devices and reestablish the session later, are received by the machine type communication-interworking function MTC-IWF the machine type communication interworking function machine type communication interworking function MTC-IWF may forward such session description information to the policy deciding function or entity, preferably in form of the policy charging rules function PCRF. The policy charging rules function PCRF then performs a policy decision.

If there is an indication from the machine type communication-interworking function machine type communication interworking function MTC-IWF that bearers of some user devices UD can be released in order to free resources or should be modified with a lower quality of service QoS then the policy deciding entity, i.e. here the policy and charging rule function PCRF, creates a corresponding rule. This rule is then applied on a bearer level, for example for the packet data network gateway PGW, the serving gateway SGW, the evolved node B eNB and the user device UD.

To notify affected user devices UD it is possible to use GTP options, that there occurred congestion or overload and for example preferably start a backoff-timer and/or refrain from sending service requests until it is notified that the congestion/overload situation is resolved.

Figure 5:
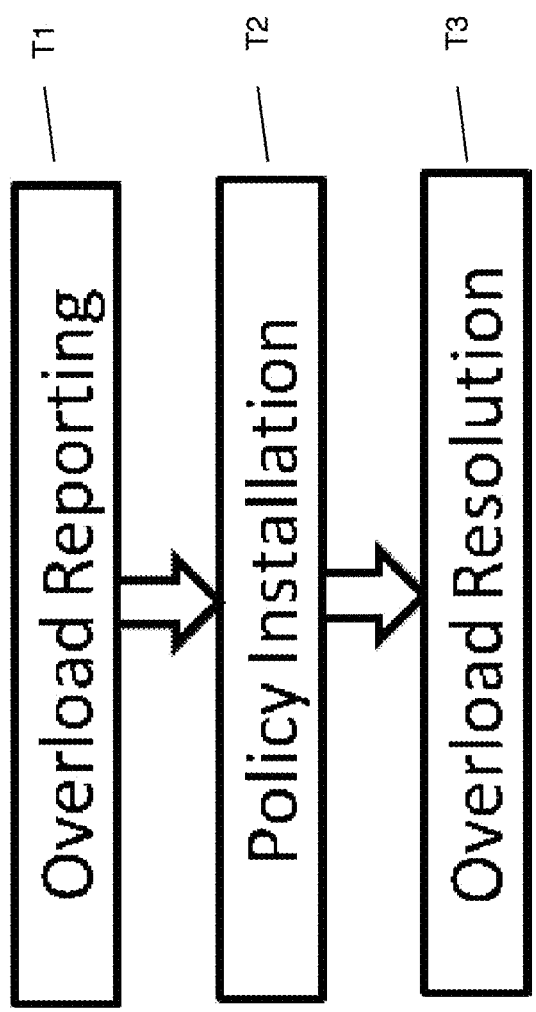
FIG. 5 shows steps of part of a method according to a second embodiment of the present invention.

FIG. 5 shows steps of part of a method according to a second embodiment of the present invention.

In FIG. 5 the principal steps for overload resolution is shown.

In a first step T1 overload reporting together with overload detection is performed.

In a second step T2 which may preferably be a conventional policy installation procedure and after policy installation in a third step T3 the resolution of the overload is provided.

Figure 6:
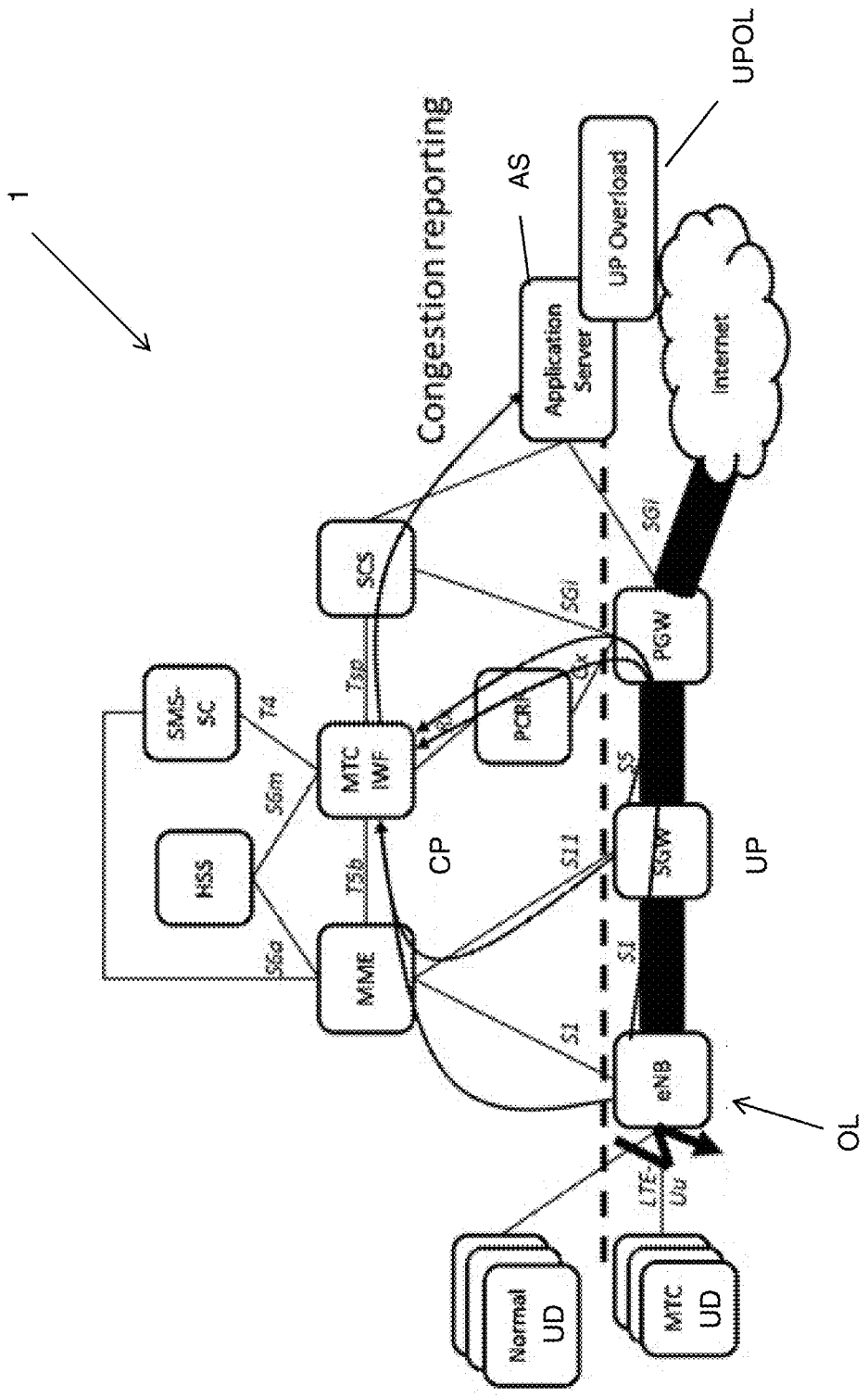
FIG. 6 shows a system according to a third embodiment of the present invention.

FIG. 6 shows a system according to a third embodiment of the present invention.

In FIG. 6 a user plane overload reporting of a mobile communication system 1 is shown.

FIG. 6 shows two different possibilities how to report a user plane overload situation. Overload reporting may be performed either in the control plane for example by NAS signaling via the interfaces S1 and T5b from the evolved node B eNB on which overload OL occurred or by piggybacking in the user plane UP by using GTP options for example, and interfaces sequence S1-55-Gx-Rx at an example of the evolved node B eNB in a core network of a 3GPP mobile communication network.

Of course the invention is not limited to 3GPP but may also be applied to 3GPP2, etc.

Figure 7:
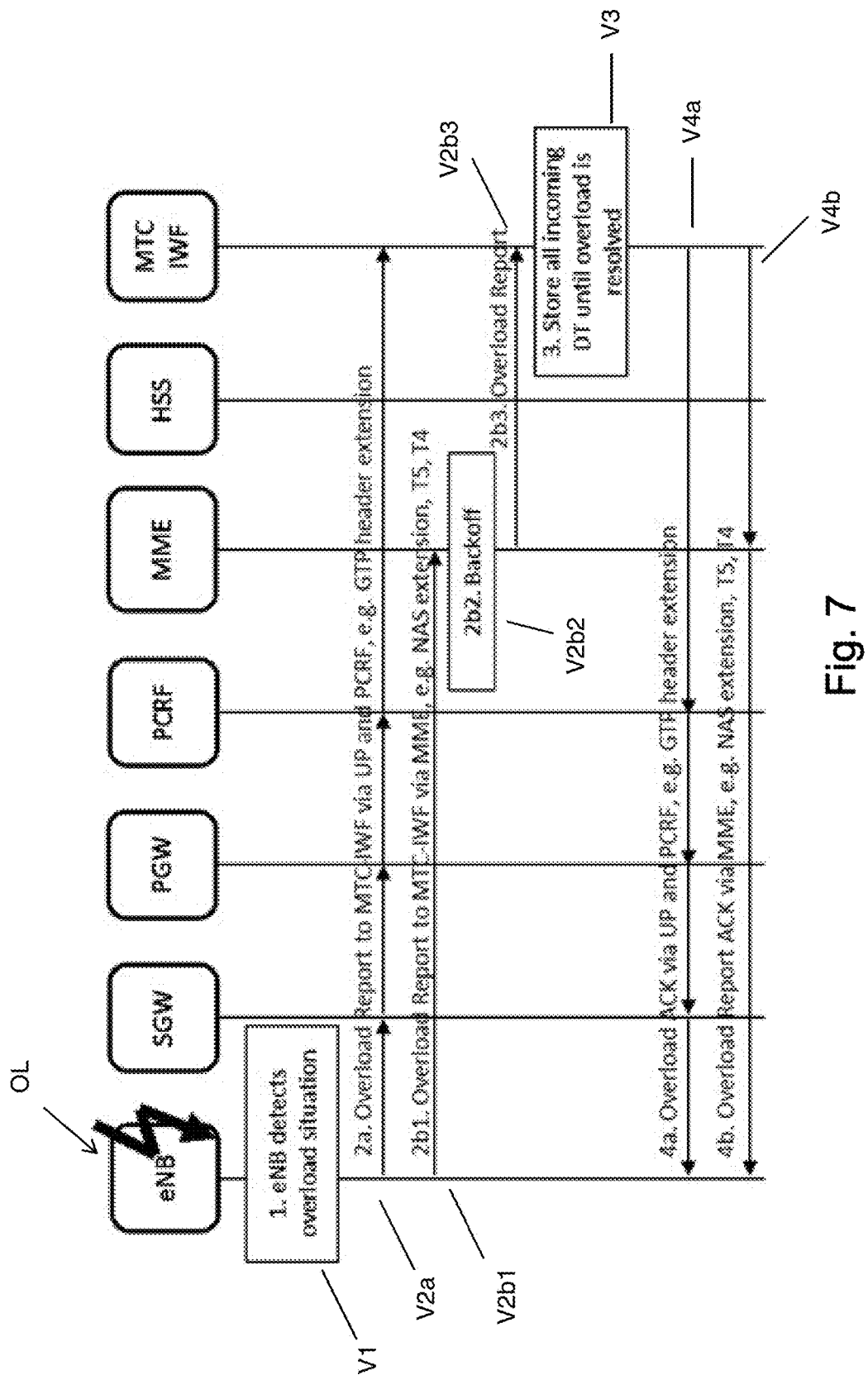
FIG. 7 shows steps of part of a method according to a forth embodiment of the present invention.

FIG. 7 shows steps of part of a method according to a forth embodiment of the present invention.

In FIG. 7 an example for overload reporting the user plane is shown. In FIG. 7 the evolved node B eNB experiences the overload. Of course instead of the evolved node B eNB any other entity in the network could alternatively or additionally experience overload, for example the serving gateway SGW, the packet data network gateway PGW, the mobility management entity MME, etc. In case detection origin and reporting origin are different the usage of the two options in FIG. 3 may be limited.

In detail in a first step V1 the evolved node B eNB detects the overload situation.

For the second step V2 there are now two options to report the overload situation to the machine type communication interworking function MTC-IWF.

In the first option, denoted with a in a second step with V2a the evolved node B eNB sends an overload report to the machine type communication interworking function MTC-IWF via the serving gateway SGW, the packet data network gateway PGW and the policy charging rule function PCRF, for example with GTP header extension and extension of Gx and Rx protocols.

In the second option denoted with b in a second step V2b1 the evolved node B eNB sends the overload report to the mobility management entity MME for example via NAS message extensions. In a further second step V2b2 the mobility management entity MME performs a mapping of the identification of the evolved node B eNB, for example the eNB global cell ID and maps it to a geographic region. Further a data based lookup may be performed in order to detect all MTC user devices UD in this mapped geographic area. The mobility management entity MME then may start a back-off timer for those resolved MTC user devices UD. In a further step V2b3 the mobility management entity MME sends the overload report to the machine type communication interworking function machine type communication interworking function MTC-IWF and may include binding information of the machine type communication user devices UD and/or may include the resolved geographic information and/or may include the resource identifier, here in form of the evolved node B global cell identification eNB global cell ID.

In a third step V3 the machine type communication-interworking function machine type communication interworking function MTC-IWF now starts a procedure as described in FIG. 8 below as a response to incoming device trigger DT request until the overload situation is resolved. The machine type communication interworking function machine type communication interworking function MTC-IWF may filter the request and allow device triggers DT that would not affect the overloaded resources, for example filter based on location. Alternatively the machine type communication-interworking function machine type communication interworking function MTC-IWF may forward all modified user device triggers DT in case that the application server AS itself modified the device trigger DT request according to the overload reporting received according to FIG. 8 so that the triggered user device UD at the overloaded node eNB only delivers a minimum of data.

In a fourth step V4a, V4b which is dependent on whether the first or second option was used to deliver the overload report to the machine type communication interworking function MTC-IWF, the reversed direction is used to sent back acknowledgements.

Figure 8:
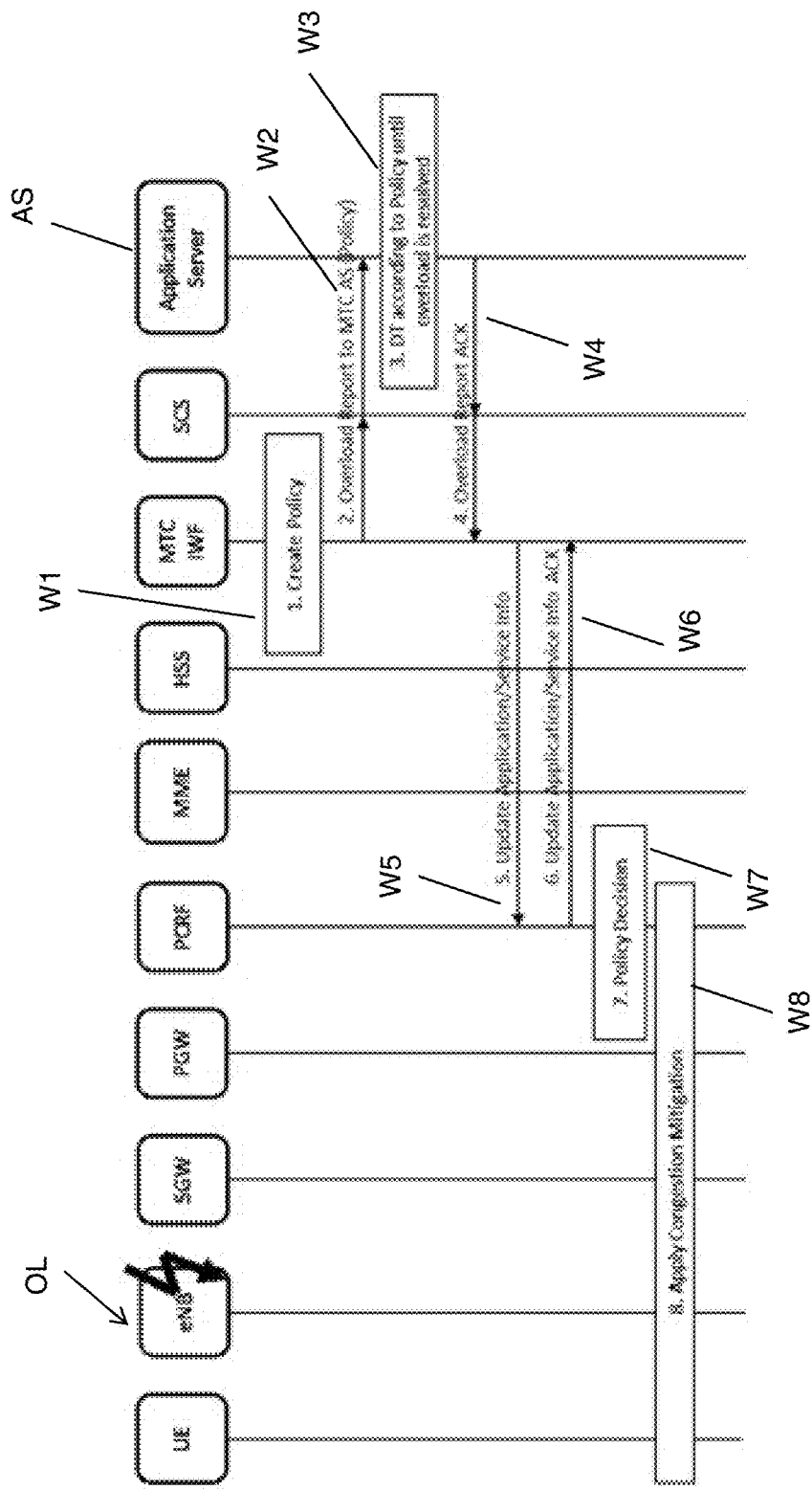
FIG. 8 shows steps of part of a method according to a fifth embodiment of the present invention.

FIG. 8 shows steps of part of a method according to a fifth embodiment of the present invention.

In FIG. 8 steps of a policy installation are shown when the machine type communication interworking function machine type communication interworking function MTC-IWF receives the overload report as shown in FIG. 7, third step V3:

In a first step W1 the machine type communication interworking function machine type communication interworking function MTC-IWF has received the overload report from the entity or node in the mobile communication network experiencing the overload and creates a overload policy, for example the policy provides rejection of all device triggers DT for affected machine type communication user devices UD served by that resource/node.

In case the machine type communication interworking function machine type communication interworking function MTC-IWF does not know the corresponding MTC application servers AS for the affected MTC user devices, the machine type communication interworking function MTC-IWF waits until it receives a device trigger DT for one of the affected user devices UD. Then it performs Step W2-W4.

In case the machine type communication interworking function machine type communication interworking function MTC-IWF knows that the mobility behaviour of the affected MTC user devices UD is nomadic, then it may include a list of the affected user devices UD, else it may only include the geographic area. The service capability server SCS or the application server AS are operable to resolve the MTC user devices UD in a geographic area for fixed installed MTC user devices UD and the machine type communication interworking function machine type communication interworking function MTC-IWF has to know that the service capability server SCS/MTC application server AS support this capability, else the machine type communication interworking function machine type communication interworking function MTC-IWF sends the list of affected user devices UD.

In a second step W2 the machine type communication interworking function MTC-IWF sends an overload report to the MTC application server AS including the policy e.g. that MTC user devices UD in a certain geographic area are not allowed to be triggered. The machine type communication interworking function MTC-IWF may include a list of affected MTC user devices UD.

In a third step W3 the MTC application server AS installs the policy, e.g. enforcing a refrain from triggering user devices UD of a certain area until the overload situation is resolved. The machine type communication application server AS may provide updated application information for the affected MTC user devices UD. The application server AS could alternatively itself modify device trigger DT requests according to the overload report for the affected user devices UD, so that only a minimum of data is delivered. This minimum device trigger DT may be marked so that the machine type communication interworking function machine type communication interworking function MTC-IWF understands it so that it would then forward such device triggers DT.

In a fourth step W4 the MTC application server AS acknowledges the overload report and the installation of the policy. Additionally the service capability server SCS and/or the machine type communication application server AS may inform the machine type communication interworking function machine type communication interworking function MTC-IWF about further session description parameters (e.g.

MTC user devices in the overloaded area can release their sessions as low-priority devices and re-establish the session later).

In a fifth step W5 the machine type communication interworking function MTC-IWF resolves the affected MTC user devices UD at the overloaded node and if additional session description parameters were received from the service capability server SCS and/or the machine type communication application server AS, the machine type communication interworking function machine type communication interworking function MTC-IWF sends an update of the application information and service information to the policy and charging rule function PCRF in order to mitigate the congestion. The machine type communication interworking function MTC-IWF may try to indicate by e.g. setting the maximum bit rate MBR to zero which user devices UD with ongoing bearers to release in order to free resources.

In a sixth step W6 the policy and charging rules function PCRF acknowledges the update message.

In a seventh step W7 the policy and charging rules function PCRF performs a policy decision. In case there is an indication from the machine type communication interworking function MTC-IWF that the bearers of some MTC user devices UD can be released in order to free resources of should be modified with lower QoS, then the policy and charging rules function PCRF creates a rule accordingly.

In an eighth step W8 the rule is applied on bearer level. It is possible to notify the affected MTC user device UD, e.g. via GTP Options that there occurred a congestion and it should e.g. start a back-off timer, or refrain from sending service requests until it gets notified again when the congestion situation is resolved.

Figure 9:
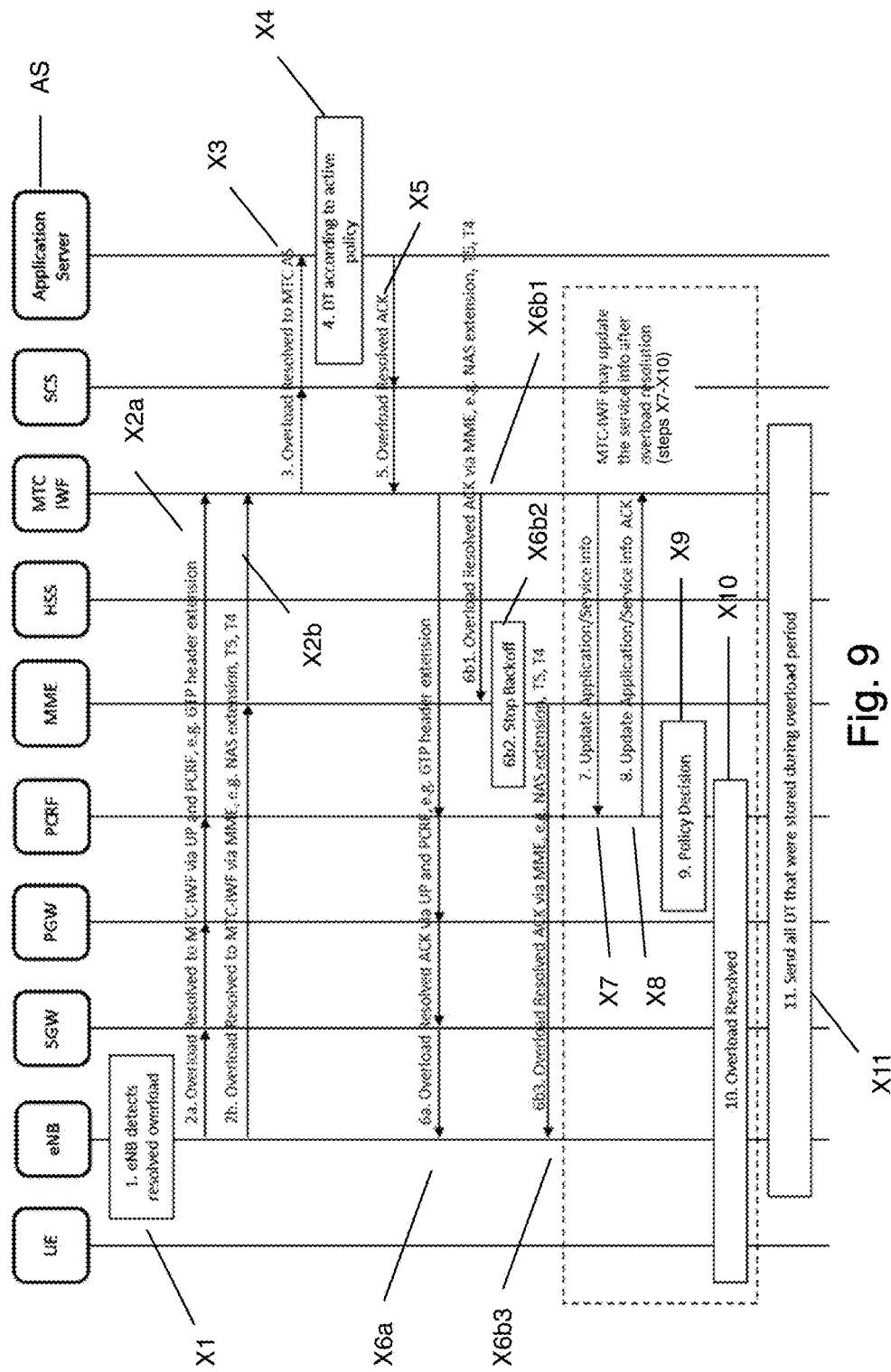
FIG. 9 shows steps of part of a method according to a sixth embodiment of the present invention.

FIG. 9 shows steps of part of a method according to a sixth embodiment of the present invention.

In FIG. 9 steps of the call flow for the overload resolution is shown. Overload has occurred at the evolved Node B eNB.

In a first step X1 the evolved node B eNB detects that the overload situation is resolved.

There are now two options to report the overload situation to the machine type communication interworking function MTC-IWF:

Option a:

In a second step X2a, the eNB sends an Overload Resolved report to machine type communication interworking function MTC-IWF via the serving gateway SGW, the packet data network gateway PGW and the policy and charging rule function PCRF, e.g. with GTP Header Extensions.

Option b:

In a second step X2b, the evolved node B eNB sends the overload resolved report or message to the mobility management entity MME e.g. via NAS message extensions. The mobility management entity MME may map the eNB Global Cell ID to a geographic area and may perform a database lookup in order to detect all MTC user devices UD in this area. The mobility management entity MME sends the overload resolved message or report to the machine type communication interworking function MTC-IWF and it may include the binding information of the MTC user devices UD and/or it may include the resolved geographic information and/or it may include the eNB Global Cell ID.

In third step X3 the machine type communication interworking function MTC-IWF sends the overload resolved message or report to the MTC application server(s) AS to which the overload report was sent before according to FIG. 6. The machine type communication interworking function MTC-IWF may include the affected area information and/or a list of affected MTC user devices UD if available.

In a fourth step X4 the MTC application server removes the installed policy. The machine type communication application server AS may provide updated application information for the affected MTC user devices.

In a fifth step X5 the MTC application server AS acknowledges the overload resolution and the removal of the policy.

In a sixth step X6 dependent on which option—Option a or b—was used to deliver the overload resolved message or report to the machine type communication interworking function MTC-IWF, the reverse direction would be used to send back the acknowledgement. The mobility management entity MME may stop the back-off timer for those MTC user devices UD in case it started them at Step X6b2 or already in Step X2b.

In a seventh step X7 the MTC-IWF resolves the affected MTC user devices UD at the formerly overloaded node and sends an update of the application information and service information to the policy and charging rule function PCRF to indicate that normal resources can be allocated again for the MTC user devices UD.

In an eighth step X8 the policy and charging rule function PCRF acknowledges the update message.

In a ninth step X9 the policy and charging rule function PCRF performs a policy decision. In case the policy and charging rule function PCRF released some bearers before it could now perform a dedicated bearer setup for such user devices UD or upgrade again the QoS to the normal setting before the congestion situation.

In a tenth step X10 the overload is resolved and the rule is applied on bearer level. It is possible to notify the affected MTC user device UD, e.g. via GTP Options, that the congestion is resolved and it should e.g. stop the back-off timer, or start sending service requests.

In an eleventh step X11 all device triggers DT that were stored within the overload period are continued to be transmitted respectively sent to the respective MTC user devices UD.

Figure 10:
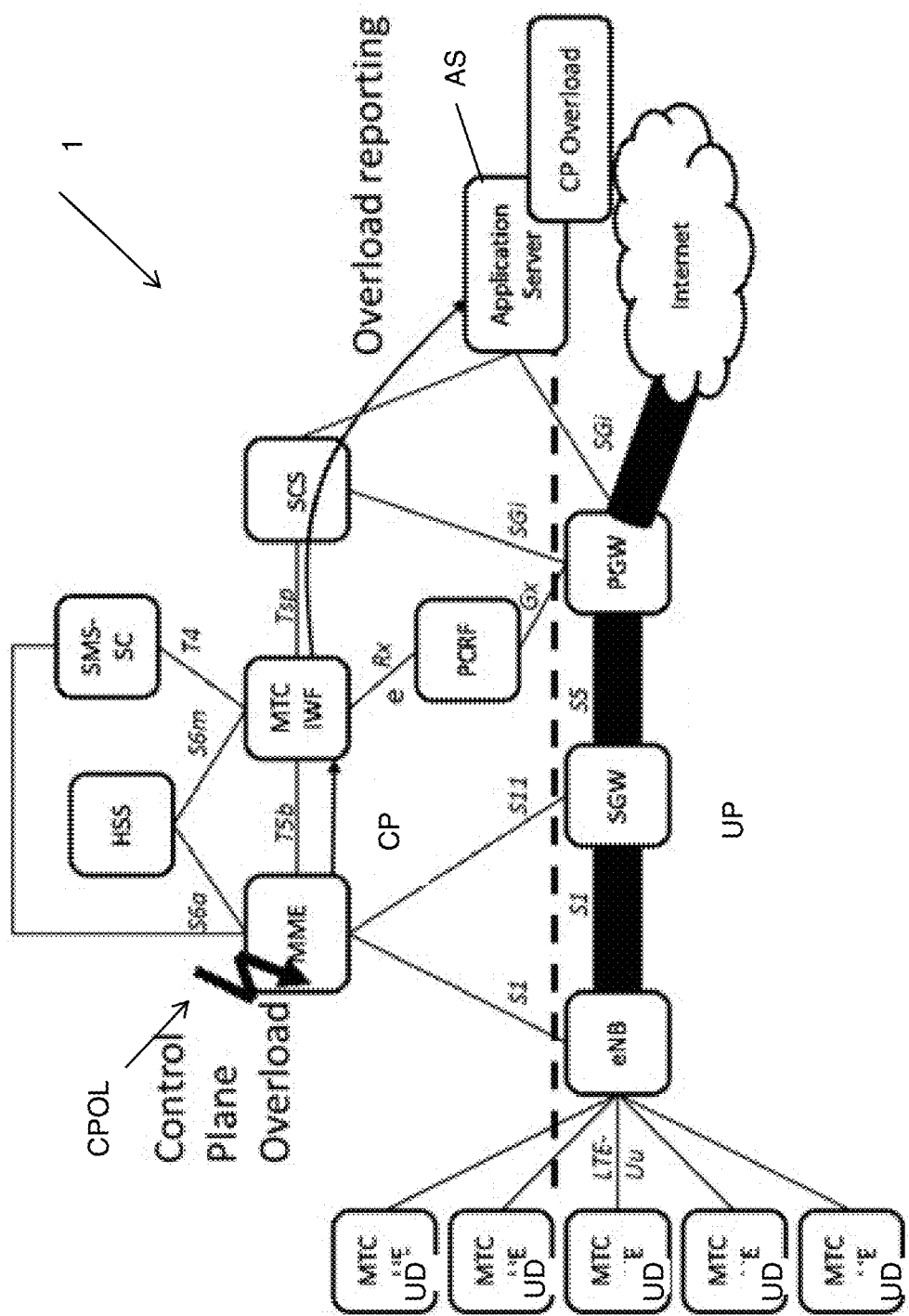
FIG. 10 shows a method according to a seventh embodiment of the present invention.

FIG. 10 shows a system according to a seventh embodiment of the present invention In FIG. 10 reporting of an overload of a control plane overload CPOL is shown. The serving node is now the mobility management entity MME instead of the evolved node B eNB as shown in the previous figures. Further the number of affected devices for the control plane overload CPOL is greater. Overload reporting is then performed via the T5b interface to the machine type communication interworking function MTC-IWF then via the Csp interface to the service capability server SCS to the application server AS.

However overload reporting according to FIG. 3 is similarly performed.

Figure 11:
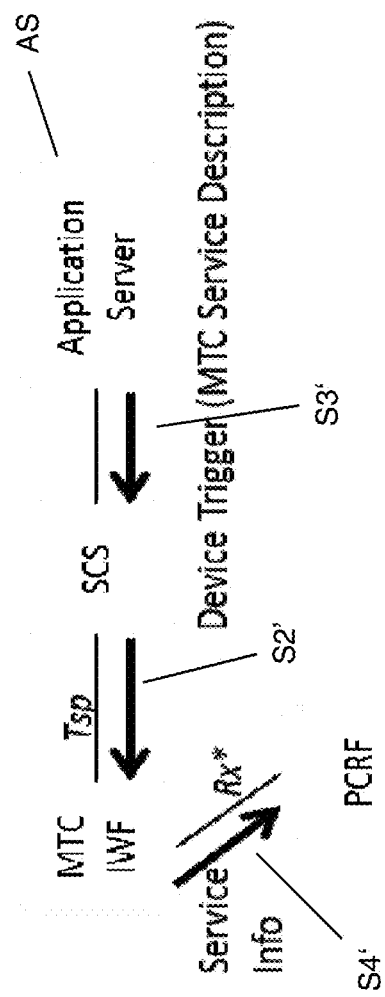
FIG. 11 shows part of the steps of a method according to a eighth embodiment of the present invention.

FIG. 11 shows part of steps of a method according to an eighth embodiment of the present invention.

In FIG. 11 the steps for device triggering and policy installation are shown.

In a step S3' the application server AS sends Application/Service specific description information, e.g. device trigger DT with machine type communication service description, to the service capability server SCS and further in a step S2' to the machine type communication interworking function MTC-IWF. The machine type communication interworking function MTC-IWF provides service info in a further step S4' to the policy and charging rules function PCRF. Therefore service information from the application server AS as indicated to the machine type communication-interworking function MTC-IWF, so that machine type communication service specific policy control can be performed at the time of the device triggering using Rx-like interface, named here Rx* between the machine type communication interworking function MTC-IWF and the policy and charging function PCRF and by handling service description and service information on the Tsp interface between the machine type communication interworking function machine type communication interworking function MTC-IWF via the service capability server SCS and the application server AS.

In other words, the embodiment from FIG. 11 describes a method for installing of policy rule(s) specific to the MTC application description, including the corresponding bearer configuration for optimized MTC traffic per application and MTC device at the time of device triggering.

The machine type communication application server AS includes either an application identifier being configured at the machine type communication interworking function MTC-IWF beforehand or it includes the service description for the application directly. The service description may for example be the arrival time, packet size, triggering interval, mobility characteristics, etc. and is used by the machine type communication interworking function MTC-IWF. In case the machine type communication application server AS only sends an application identifier, then the machine type communication-interworking function MTC-IWF resolves the application identifier with the corresponding service description for this application. The machine type communication-interworking function MTC-IWF then acts as an application function AF and sends the service description to the policy and charging rules function PCRF which in turn creates a policy rule based on the service description for the MTC user device UD. The machine type communication interworking function MTC-IWF may deliver the trigger according to the most appropriate delivering mechanism, for example via the T4 or the T5 interface as specified in 3GPP TS 23.682 either in parallel to the policy control or afterwards when the triggering of the MTC user device UD was successful.

The general method described the FIG. 11 can preferably be applied in connection with the general method described in FIG. 4. For example, if a communication request comes from the application server as described in FIG. 11, after processing the information the mobile network, the mobile communication network can reply to the application (e.g. using steps S2 and S3 from FIG. 4).

Figure 12:
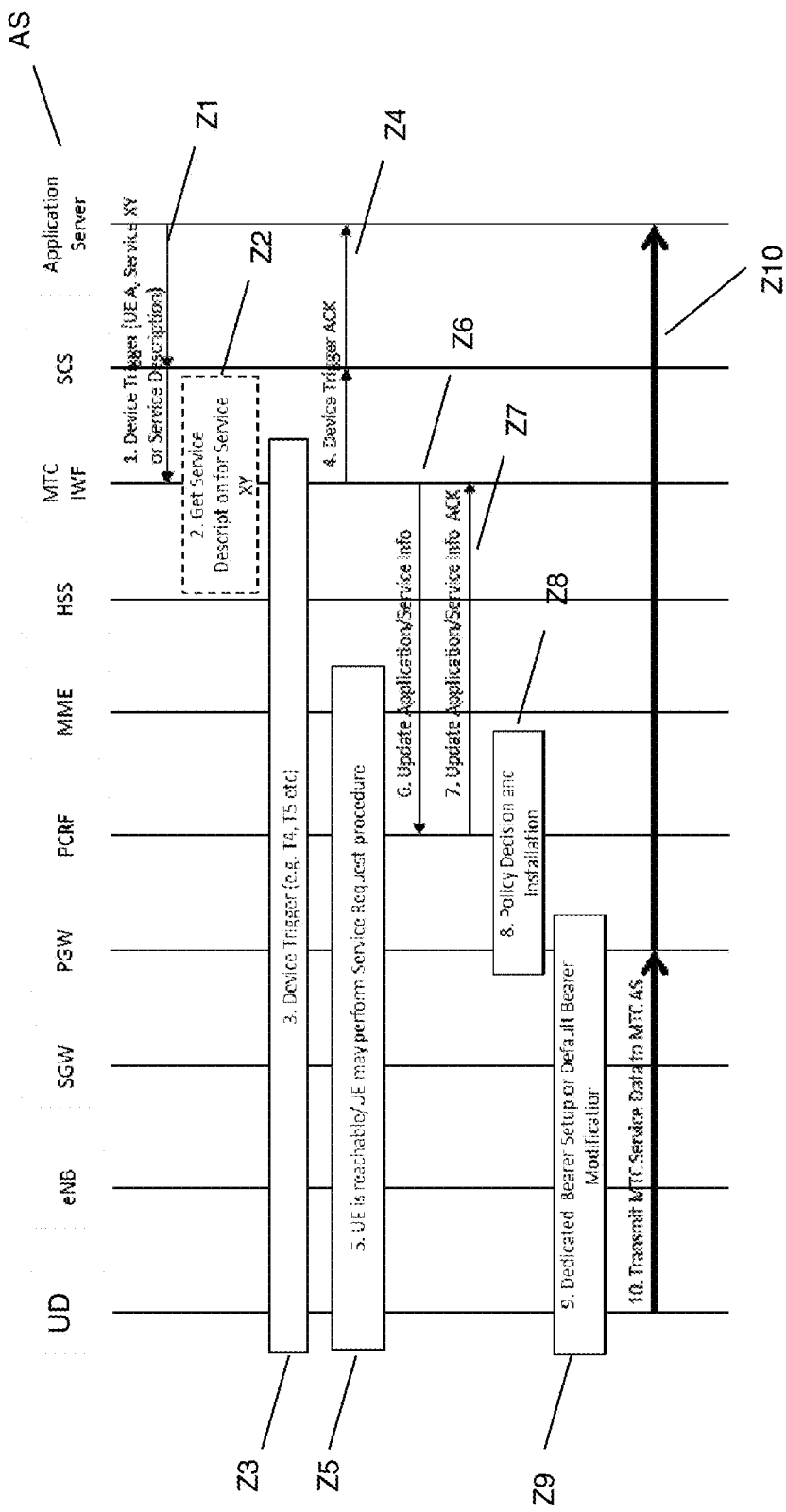
FIG. 12 shows steps of part of a method according to a ninth embodiment of the present invention.

FIG. 12 shows part of steps of a method according to a ninth embodiment of the present invention.

In FIG. 12 steps of an example core flow for providing policy control at the time of the device triggering is shown:

In a first step Z1 the machine type communication application server AS sends a device trigger DT for a specific MTC device to the machine type communication interworking function MTC-IWF via the serving capability server SCS. The machine type communication application server AS includes either an application identifier, which is configured at the machine type communication interworking function MTC-IWF beforehand, or it includes the service description or service information for the application directly. The service description may comprising parameters like e.g. inter-arrival time, packet size, triggering interval, mobility characteristics etc. and is used by the machine type communication interworking MTC-IWF. Examples of their usage are given below.

In a second step Z2 in case the machine type communication application server AS only sends an application identifier, then the machine type communication interworking function MTC-IWF resolves the application identifier with the corresponding service description for this application (e.g. based on local configuration).

In a third step Z3 the machine type communication interworking function MTC-IWF then delivers the device trigger DT according to the most appropriate delivery mechanism e.g. T4, T5, as specified in 3GPP TS 23.682.

In a fourth step Z4 when the device triggering was successful the machine type communication interworking function MTC-IWF sends a trigger acknowledgement to the machine type communication application server AS.

In a fifth step Z5 the user device UD is now reachable and may perform a service request procedure to the mobility management entity MME to reactivate the default bearer on the S1 reference point and the radio interface.

In a sixth step Z6 the machine type communication interworking function MTC-IWF acts as an application function AF and sends the service description to the policy and charging rule function PCRF.

In a seventh step Z7 the policy and charging rule function PCRF acknowledges the update of the application information and/or service Information.

In an eighth step Z8 the policy and charging rules function PCRF creates a policy rule based on the service description for the MTC user device UD and installs the policy in the policy and charging rules function PCRF.

In a ninth step Z9 the policy and charging rules PCRF initiates a dedicated bearer setup procedure or a bearer modification procedure of the default bearer.

In a tenth step Z10 the machine type communication MTC user device UD can now send/receive data according to the application requirements. The MTC user device can send/receive data already after the fifth step Z5, but not necessarily according to the application requirements.

The steps Z7, Z8 and Z9 may be performed parallel to the device triggering according to step Z3. Step Z9 may then be performed later when the derived triggering was successful, i.e. the machine type communication interworking function MTC-IWF may have to send another message to the policy and charging rules function PCRF to indicate that the device triggering was successful. One of the advantages is that in case of unreachable device is no unnecessary resources are reserved.

The machine type communication interworking function MTC-IWF now has knowledge about the behavior of the application, for example in case of a smart meter there would be a small packet with a long inter-arrival time for reading out the current status but for firmware updates there would be a large packet size for only one time.

Further the machine type communication interworking function MTC-IWF is also able to perform device trigger scheduling based on the application service description provided from the machine type communication application server AS. The machine type communication interworking function MTC-IWF may also retrieve load levels from the serving nodes, for example the mobility management entity MME, the short message service center SMS-SC, the serving GPRS support node SGSN or the serving gateway SGW, etc. and take this into account when to send specific device triggers DT for user devices UD. For example device triggers with low priority indication, huge packet or file size or high bandwidth demands of the application service are then held back and sent later after the load of the serving node is being reduced while high priority device triggers DT with small packet sizes of the application can be sent even when the serving node experiences a high load, i.e. a network overload situation.

Service descriptions may be inter-alia used for:
a) Inter-arrival time: E.g. time between two packets sent in uplink or downlink to or from the application server, e.g. periodically reporting of a gas meter device.
b) Packet size: average expected size of the user plane data to be sent and/or received.
c) Triggering interval: in case the device goes back to idle mode after a short transmission period. This parameter indicates the time between two device triggers DT. E.g. a gas meter is triggered once a day to send its status, the trigger interval would be one day.
d) Mobility characteristics: this could be stationary, low-mobility, standard or high mobility;
e) Session Description Protocol (SDP) as it is used in Session Initiation Protocol (SIP).

In summary the present invention preferably provides a mobility management entity MME and a machine type communication-interworking function machine type communication interworking function MTC-IWF mapping the evolved node B global cell identification to achieve a geographic area and performing a data based lookup in order to detect all machine type communication user devices in this geographic area.

Further the present invention enables a detection of affected service capability servers/machine type communication application servers AS by the machine type communication-interworking function MTC-IWF.

Even further the present invention enables the machine type communication-interworking function MTC-IWF to create a policy for the service capability server SCS and/or the machine type communication application server AS installing the policy so that not all machine type communication user devices are blocked from communications.

The present invention further enables the machine type communication-interworking function MTC-IWF interworking with the policy and charging rules function PCRF for affected machine type communication user devices of network overloads so that the policy and charging rules function PCRF can initiate congestion or overload mitigation, for example bearer removal and/or quality of service downgrades.

Even further the present invention enables the application server AS to change an action in the device trigger DT according to the overload report for the affected user devices UD so that in case of triggering only a minimal data is transmitted. In this case the machine type communication interworking function MTC-IWF may still forward and deliver the device trigger DT. The remaining user plane congestion may then be handled by UPCON conventional mechanisms.

Even further the present invention enables to provisioning of application/service specific description information to the machine type communication-interworking function MTC-IWF which may be either preconfigured or mapped to an application identifier or directly together with a device trigger DT.

Even further the present invention enables an installation one or more policy rules specific to an application description, including the corresponding bearer configuration for an optimized traffic application and user device UD at the time of the device triggering DT, preferably for a connection with machine type communication.

An aspect of the present invention provides
1) Overload reporting of affected machine type communication MTC user devices served by the overloaded node in the 3GPP network to the SCS/MTC AS in order to prevent further device triggering until the overload is resolved, while non-affected machine type communication MTC devices can be still triggered.
2) Policy control and congestion mitigation on bearer level initiated by the MTC-IWF.
3) Provisioning of application/service description information over the Tsp-interface.
4) Mapping of preconfigured application identifiers to application/service descriptions in the machine type communication-interworking function MTC-IWF.
5) Provisioning of service information from the machine type communication interworking function MTC-IWF to the policy and charging rules function PCRF.
6) Scheduling of device triggers DT in the machine type communication interworking function MTC-IWF based on application description and current load information of the serving nodes.

The present invention has inter alia the following advantages:

Overload reporting of affected user devices served by the overloaded node in a 3GPP network to the service capability sever or application server AS respectively in order to prevent further device triggering until the overload is resolved while non-affected user devices can still be triggered. Policy control and congestion mitigation on a bearer level may be initiated by the function machine type communication interworking function MTC-IWF to resolve the overload situation faster.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A method for managing overload in a mobile communication network including a radio access network and a core network connected to the radio access network, wherein a plurality of non-MTC user devices and/or MTC user devices is connected to one or more base stations of the radio access network, the method comprising:
   a) detecting a presence of a network overload in the mobile communication network;
   b) generating an overload report according to the detected network overload having one or more resource identifiers of the resources of the mobile communication network on which the network overload was detected;
   c) identifying one or more user devices and/or applications affected by the network overload based on the overload report; and
   d) informing one or more serving entities serving identified user devices for temporarily suppressing communication requests.

2. The method of claim 1, further comprising:
storing suppressed communication requests until network overload is resolved.

3. The method of claim 1, further comprising:
generating one or more rules for an overload policy based on the overload report, at least for performing step d).

4. The method of claim 1, further comprising:
making connection requests.

5. The method of claim 2, further comprising:
installing an overload policy on one or more application servers hosting the identified applications and/or applications for the identified user devices.

6. The method of claim 1, further comprising:
providing session description information for the identified user devices to an overload management entity performing at least steps c) and d).

7. The method of claim 1, further comprising:
mapping the resource identifiers to a geographic area.

8. The method of claim 1, further comprising:
performing transmission of the overload report according to 3GPP TS 36.413 in an opposite direction.

9. The method of claim 1, further comprising:
transmitting the overload report in a user plane.

10. The method of claim 7, wherein the mapping is performed by a lookup in a database,
   wherein the database is maintained by the overload management entity, and/or
   wherein the database is maintained by a centralized entity of the mobile communication network.

11. The method of claim 10, further comprising:
determining and storing a mobility behavior of one or more affected user devices accordingly in the database.

12. The method of claim 10, further comprising:
creating the database of the congestion management entity at a time of a last connection request of a corresponding user device.

13. The method of claim 1, further comprising:
storing an association between the one or more geographic regions of the network overload and affected user devices and/or applications in the database.

14. The method of claim 1, further comprising:
proactively transmitting the overload report to one or more serving devices serving corresponding affected user devices.

15. The method of claim 1, further comprising, in case the overload report is transmitted from an entity different from a policy deciding entity (PCRF) in the mobile communication network:
updating and transmitting service descriptions of affected user devices to the policy deciding entity.

16. The method of claim 1, further comprising:
forwarding session description information to a policy deciding entity.

17. The method of claim 1, further comprising:
notifying the identified user devices.

18. The method of claim 1, further comprising:
initiating one or more actions with regard to the identified user devices upon providing a notification about a present overload.

19. The method of claim 1, further comprising:
performing reporting of a user plane overload via a control plane.

20. The method of claim 1, further comprising, when an overload resolution is detected:
generating a corresponding overload resolution report;
initiating a removal of a suppression of communication requests; and
continuing to deliver stored communication requests.

21. The method of claim 1, further comprising:
providing service information of an application and/or an application identifier for a user device to an overload management entity prior to a communication request and/or prior to step a).

22. The method of claim 21, wherein the overload management entity resolves the application of the application identifier and transmits corresponding resolved application information to a policy deciding entity.

23. The method of claim 21, further comprising, after successfully initiating a communication or simultaneously to the communication request of the corresponding user device:
providing updated application and/or service information to a policy deciding entity.

24. The method of claim 21, further comprising:
initiating a bearer setup procedure for sending and/or receiving data between a respective user device and a respective application according to application requirements, after network overload is resolved.

25. The method of claim 1, further comprising:
performing a scheduling of communication requests of a user device based on application and/or service description.

26. The method of claim 25, further comprising:
determining a time for sending a communication request, for or by a user device, using indirect overload information of service nodes in the core network.

27. A mobile communication network, comprising:
a radio access network;
a core network connected to the radio access network; and
a plurality of user devices in form of non-MTC user equipment and/or MTC user equipment connected to one or more base stations of the radio access network,
wherein the mobile communication network is operable to perform a method including:
   a) detecting a presence of a network overload in the mobile communication network;

b) generating an overload report according to the detected network overload having one or more resource identifiers of the resources of the mobile communication network on which the network overload was detected;
c) identifying one or more user devices and/or applications affected by the network overload based on the overload report; and
d) informing one or more serving entities serving identified user devices for temporarily suppressing communication requests.

* * * * *